(12) United States Patent
Kennedy

(10) Patent No.: US 8,616,582 B2
(45) Date of Patent: Dec. 31, 2013

(54) BOOKLET WITH ULTRA REMOVABLE ADHESIVE LABEL

(75) Inventor: Michael R. Kennedy, Gates Mills, OH (US)

(73) Assignee: The Kennedy Group Inc., Willoughby, OH (US)

( * ) Notice: Subject to any disclaimer, the term of this patent is extended or adjusted under 35 U.S.C. 154(b) by 286 days.

(21) Appl. No.: 13/004,411

(22) Filed: Jan. 11, 2011

(65) Prior Publication Data

US 2012/0175864 A1 Jul. 12, 2012

(51) Int. Cl.
*B42D 1/00* (2006.01)

(52) U.S. Cl.
USPC .......... 281/2; 281/5; 281/38; 283/67; 283/81; 156/230; 156/248; 428/40.1; 428/484

(58) Field of Classification Search
USPC ........ 270/52.18, 58.07; 281/38, 3.1; 156/227, 156/256, 265; 428/42.3, 484; 283/81; 524/311
See application file for complete search history.

(56) References Cited

U.S. PATENT DOCUMENTS

| | | |
|---|---|---|
| 3,807,771 A | 4/1974 | Greason |
| 3,995,555 A | 12/1976 | Stewart |
| 4,159,586 A | 7/1979 | Blum |
| 4,637,633 A | 1/1987 | Instance |
| 4,675,062 A | 6/1987 | Instance |
| 4,744,591 A | 5/1988 | Instance |
| 4,747,618 A | 5/1988 | Instance |
| 4,850,612 A | 7/1989 | Instance |
| 4,850,613 A | 7/1989 | Instance |
| 4,894,106 A | 1/1990 | Instance |
| 4,930,812 A | 6/1990 | Howard |
| 4,933,043 A | 6/1990 | Instance |
| 4,967,951 A | 11/1990 | Sherman |
| 4,995,641 A * | 2/1991 | Landry et al. .................. 283/67 |
| 5,021,273 A | 6/1991 | Kobayashi |
| 5,021,274 A | 6/1991 | Beck et al. |
| 5,127,676 A | 7/1992 | Bockairo |
| 5,222,766 A | 6/1993 | Instance |
| 5,228,692 A | 7/1993 | Carrick et al. |
| 5,255,456 A | 10/1993 | Franklin |
| 5,262,214 A | 11/1993 | Instance |
| 5,290,616 A | 3/1994 | Cowan et al. |
| 5,399,403 A | 3/1995 | Instance |
| 5,417,790 A | 5/1995 | Petrou |
| 5,439,721 A | 8/1995 | Pedroli et al. |

(Continued)

FOREIGN PATENT DOCUMENTS

DE 19812232 A1 12/1998
FR 2767597 A1 2/1999

(Continued)

*Primary Examiner* — Dana Ross
*Assistant Examiner* — Homer Boyer
(74) *Attorney, Agent, or Firm* — Pearne & Gordon LLP

(57) ABSTRACT

An ultra removable booklet with label for application to media is described. The booklet with label includes a release liner, an ultra removable adhesive layer, a paper stock layer, a booklet, an adhesive layer, and a clear plastic cover layer. The clear plastic cover layer has the adhesive layer applied to a bottom surface thereof and the bottom surface is positioned over the booklet. The booklet is positioned over the paper stock. The ultra removable adhesive layer is attached to the lower surface of the paper stock. The release liner is applied to the ultra removable adhesive layer. A process for forming an ultra removable booklet with label for application to media is also described.

16 Claims, 7 Drawing Sheets

(56) References Cited

U.S. PATENT DOCUMENTS

| | | |
|---|---|---|
| 5,489,456 A | 2/1996 | Instance |
| 5,490,692 A | 2/1996 | Howard |
| 5,587,222 A | 12/1996 | Hoffman |
| 5,605,730 A | 2/1997 | Treleaven |
| 5,628,858 A | 5/1997 | Petrou |
| 5,700,537 A | 12/1997 | Instance |
| 5,728,469 A | 3/1998 | Mann et al. |
| 5,766,716 A | 6/1998 | Barry |
| 5,804,271 A | 9/1998 | Barry |
| 5,830,550 A | 11/1998 | Treleaven et al. |
| 5,846,623 A | 12/1998 | Denny |
| 5,921,581 A | 7/1999 | LaLande |
| 6,006,669 A | 12/1999 | Klein et al. |
| 6,027,780 A | 2/2000 | Treleaven et al. |
| 6,037,029 A | 3/2000 | Instance |
| 6,057,019 A | 5/2000 | Barry |
| RE37,164 E | 5/2001 | Petrou |
| 6,228,451 B1 | 5/2001 | Boudouris et al. |
| 6,270,121 B1 | 8/2001 | Dolan et al. |
| 6,329,034 B1 | 12/2001 | Pendry et al. |
| 6,432,500 B1 | 8/2002 | Jones et al. |
| 6,502,813 B1 | 1/2003 | Dahlquist |
| 6,511,097 B2 | 1/2003 | Dahlquist |
| 6,701,653 B2 | 3/2004 | Chess et al. |
| 6,730,185 B2 | 5/2004 | Kennedy |
| 6,749,229 B2 | 6/2004 | Kennedy |
| 6,983,932 B2 | 1/2006 | Denny |
| 7,018,499 B2 | 3/2006 | Furst et al. |
| 7,135,084 B2 | 11/2006 | Furst et al. |
| 7,211,163 B2 | 5/2007 | Kennedy |
| 8,333,872 B2 * | 12/2012 | Propst et al. ............... 162/164.1 |
| 2003/0070338 A1 | 4/2003 | Roshkoff |
| 2003/0127180 A1 | 7/2003 | Williams |
| 2003/0151245 A1 | 8/2003 | Levine et al. |
| 2005/0081415 A1 | 4/2005 | Mark |
| 2006/0102704 A1 | 5/2006 | Reynders et al. |
| 2007/0193899 A1 | 8/2007 | Weber et al. |
| 2008/0256904 A1 | 10/2008 | Engel et al. |
| 2010/0293829 A1 | 11/2010 | Miles et al. |
| 2012/0096751 A1 | 4/2012 | Ray, III et al. |

FOREIGN PATENT DOCUMENTS

| | | |
|---|---|---|
| JP | H02-78597 A | 3/1990 |
| JP | H04-100888 U | 9/1992 |
| KR | 10-2004-0043699 A | 5/2004 |
| WO | 01/16853 A1 | 3/2001 |

\* cited by examiner

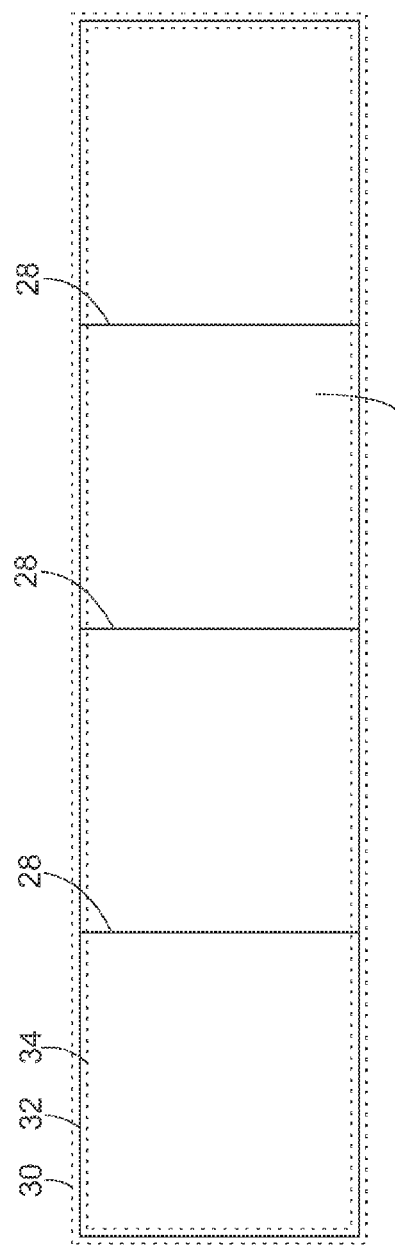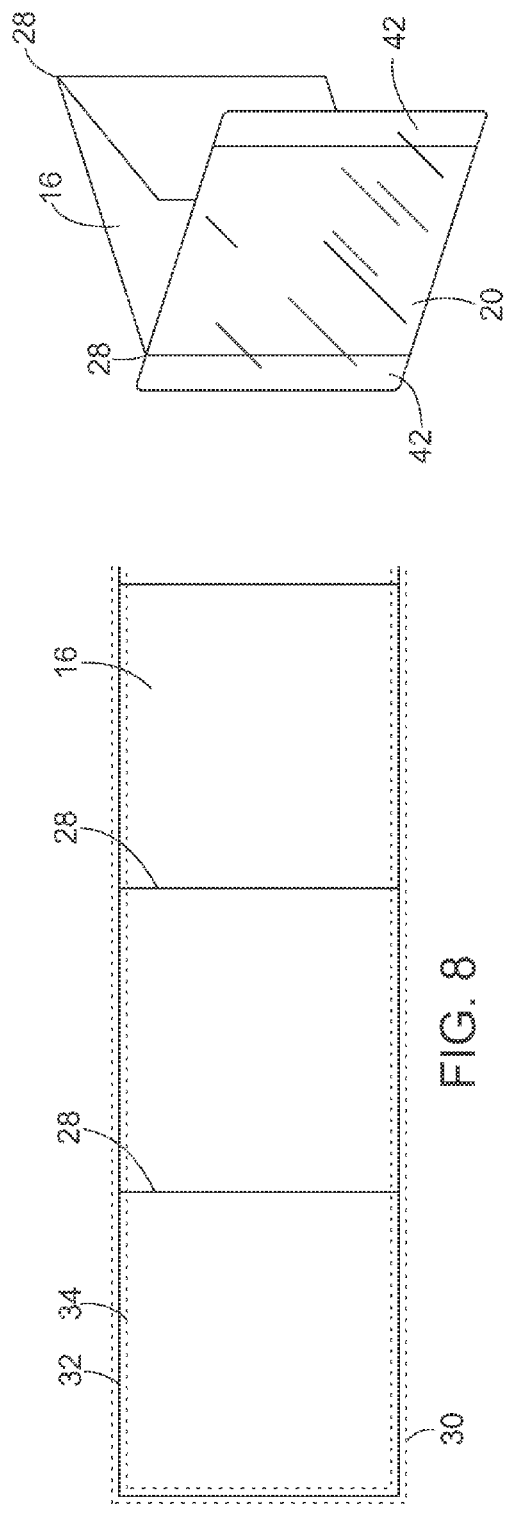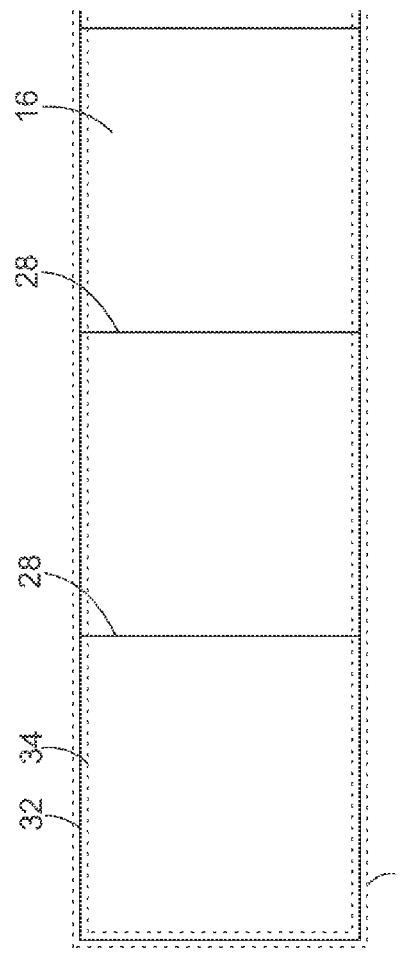

BOOKLET WITH ULTRA REMOVABLE ADHESIVE LABEL

FIELD

This technology relates to a booklet for application to media. In particular, the technology concerns a booklet having an ultra removable adhesive label layer that is removable from newsprint without damaging the newsprint. The booklet may include printed matter, such as advertising materials.

BACKGROUND

It is known to have booklets attached to labels, which are utilized in connection with media. A typical booklet includes a folded booklet portion that is applied to a label, which is then adhered to a surface with a permanent adhesive. One type of assembly utilizes a clear plastic liner, such as polypropylene. The plastic liner remains permanently affixed to the newspaper, but the paper is still readable through the liner. The booklet may be torn completely from the plastic liner. When the booklet is removed, it does not have any adhesive or sticky surfaces. Because of the use of a plastic liner that is applied directly to the newsprint, these types of booklets have been known to foul up the production line when labels are misapplied. In addition, the permanently adhered plastic layer on newsprint poses a recyclability issue.

FIG. 1 shows a prior art booklet that is positioned on a liner 1. The liner 1 is a web that may be pulled through a printing press. A clear plastic label 2 is attached to the liner 1 with a permanent adhesive (not shown). A booklet 3 is coupled to a clear plastic cover 4 that adheres to the underlying plastic label 2. The clear plastic cover 4 is longer than the length of the booklet 3 and adheres to the top surface of the booklet. Perforations 5 are provided at the ends of the cover 4 to allow a user to tear off the excess plastic when removing the booklet 3 from the plastic cover 2.

SUMMARY

In accordance with the teachings described herein, a booklet with a label having an ultra removable adhesive is described.

BRIEF DESCRIPTION OF THE DRAWING FIGURES

FIG. 6 is a plan view of the eight page booklet of FIG. 5 in an unfolded position;

FIG. 7 is a perspective view of an example six page booklet;

FIG. 8 is a plan view of the six page booklet of FIG. 7 in an unfolded position;

DETAILED DESCRIPTION

Figure 1:
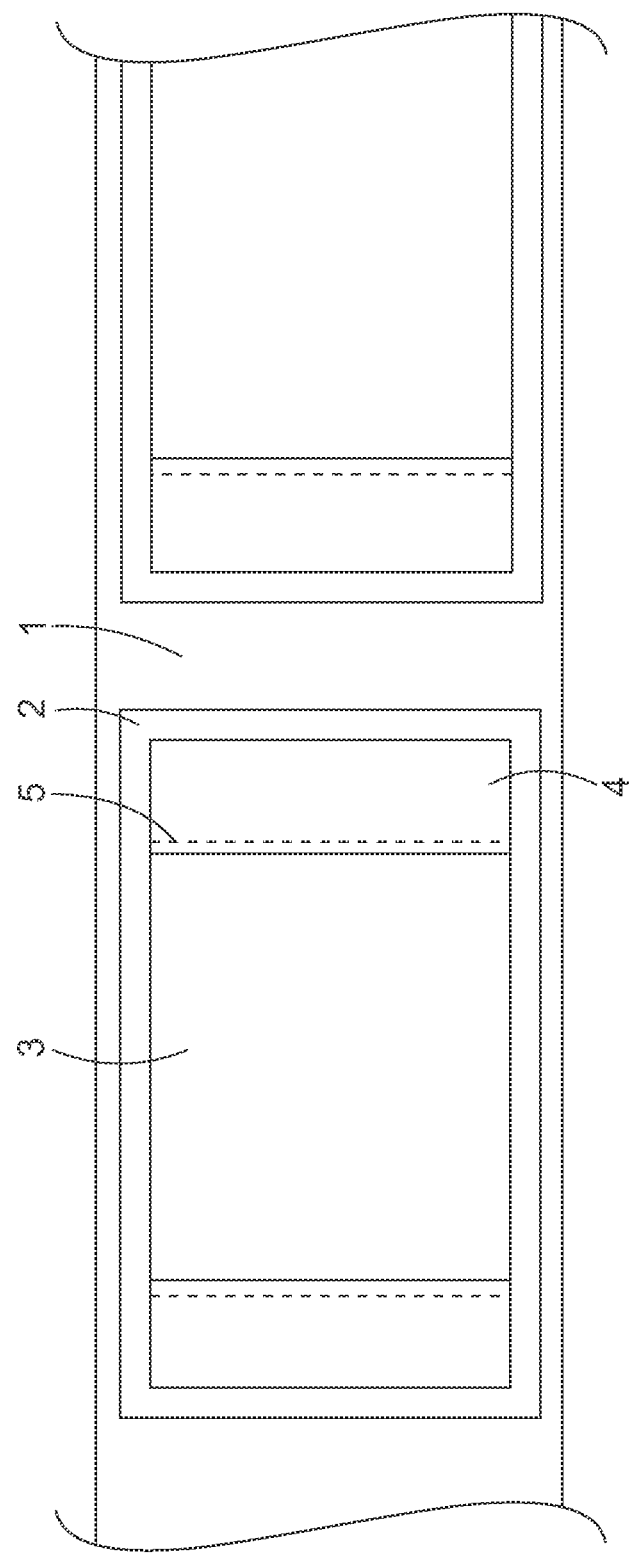
FIG. 1 is a plan view of a prior art label and booklet that incorporates a permanently adhered label.

The example booklet with removable adhesive label 10 is utilized on newsprint and other media to provide an advertising booklet 16 that is wholly removable from the newsprint. An ultra removable adhesive 12 is utilized that adheres properly to the newsprint during dispensation of the label 14 from a dispensing apparatus and installation of the label 14 onto newsprint on a moving printing press. A label 14 is removable from a booklet 16 so that the newsprint is not damaged or torn when the label 14 is removed and no or minimal adhesive 12 remains on the newsprint. The booklet 16 may be torn from the label 14 so that only the booklet remains. The example booklet with label 10 may be applied successfully with both high speed and slower speed printing presses.

The example booklet with label 10 may be dispensed onto the pages of a newspaper. It is important to recognize that if the adhesive that is utilized is too weak, the labels 14 will fly off the newsprint and be wasted. The labels 14 may also be prematurely dispensed from the liner 18 by the application machinery and may never reach the newsprint. With the higher speed machines of today, it is important to match the various materials of the booklet/label 10 to the paper and the speed of the printing process. A goal of the example booklet with label 10 is to provide a high success rate in the application of the booklet/label 10 to newsprint with high speed printing presses, such as those in an approximate speed range of 40,000-60,000 papers per hour. If the adhesive is too gummy, it may cause damage to the newsprint or foul the printing press.

Prior art label applications with a label that included a plastic liner that was permanently applied often resulted in the plastic labels fouling the printing presses. Prior art techniques had an approximately 60% application success rate, which is generally unacceptable. A desired success rate is in the range of 90-95% or greater application success.

Figure 2:
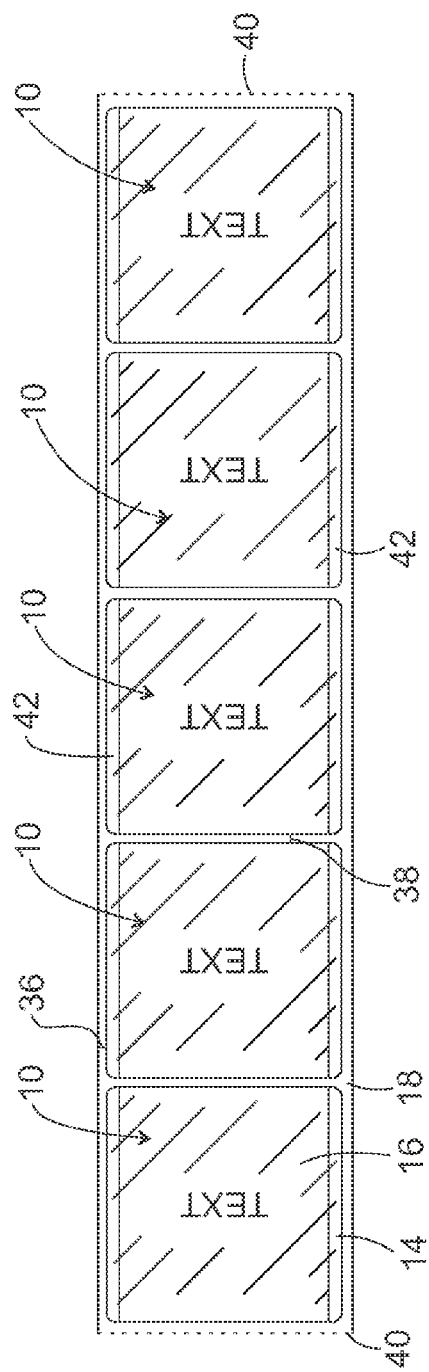
FIG. 2 is a plan view of a plurality of example labels and booklets applied to a release liner.
Figure 3:
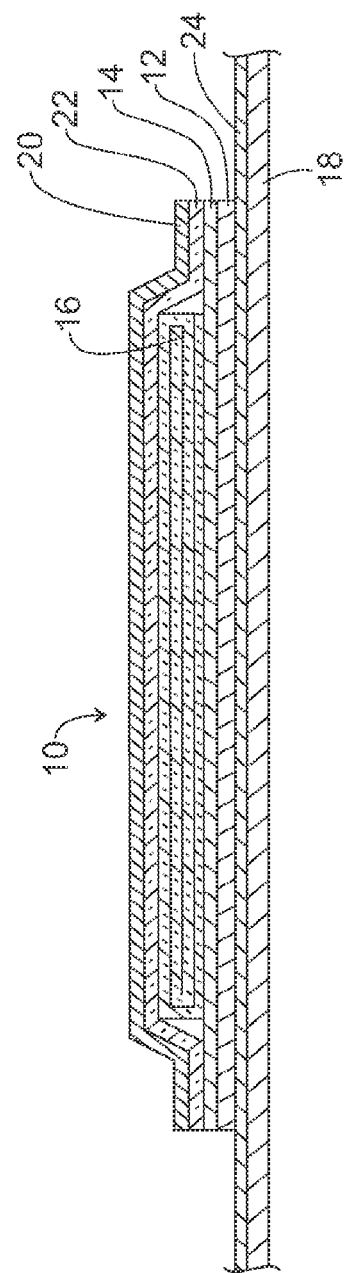
FIG. 3 is a cross-sectional view of an example booklet and label applied to a release liner.

FIG. 2 depicts a series of example booklets with labels 10 applied to a web 18, which in this case is a liner. FIG. 3 depicts a cross-sectional view of a completed booklet with label 10, as applied to a web 18, such as is shown in FIG. 2.

The example booklet with label 10 shown in FIGS. 2 and 3 incorporates the following layers. A top or cover layer 20 is a clear plastic material, such as polypropylene. Alternatively, the top layer 20 could be a paper layer with printed material applied to the paper layer. A permanent or a removable adhesive 22 may be applied to the underside of the top layer 20 and may or may not adhere to the top page of the booklet 16. When the entire top layer 20 is coated with adhesive 22, the adhesive 22 adheres to both the booklet 16 and the label 14. There are examples where the adhesive 22 may be provided only on the ends 42 of the cover 20, in which case the cover 20 will not adhere to the booklet 16. Any type of adhesive, whether permanent or removable, may be used, as known by those of skill in the art. The top layer 20 with adhesive 22 may be manufactured in advance on a roll in a preassembled manner, or the adhesive 22 may be applied to the top layer 20 during printing. An example of a top layer cover material 20 is polypropylene that is manufactured by Mobil.

A booklet 16 is folded and positioned below the top layer 20 and above a paper stock layer 14. The paper stock layer 14 is referred to herein as a label 14 and is the layer that is adhered to newsprint during dispensing. The booklet 16 does not adhere to the label 14, but could, if desired. The paper stock layer 14 includes an ultra-removable adhesive layer 12 attached to the lower surface thereof. The paper stock layer 14 is adhered to a release liner 18 that may be coated with a release agent 24, such as a silicon material. This allows for easy removal of the label 14 from the release liner 18.

The adhesive 12 on the label 14 is coupled with the release agent 24 so that the label 14 remains in place on the liner 18 when desired and is removable from the liner 18 when desired. The adhesive 12 is an ultra-removable adhesive that has tack and peel qualities that allow it to be applied to and removed from newsprint without tearing the newsprint. In addition, the release liner 18/release agent 24 combination has a release level that assists in removal of the label 14 therefrom.

Figure 5:
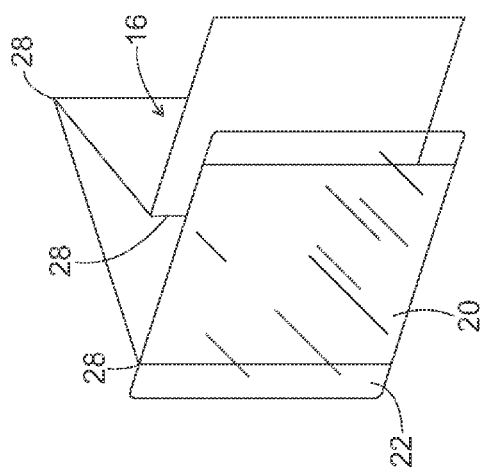
FIG. 5 is a perspective view of an example booklet after the example label has been removed.

The booklets 16 shown are formed with a plow fold or double parallel fold. Other types of folds may also be used, including accordion fold and roll fold, among others, the invention not being limited to a particular type of fold. An example of a double parallel fold is shown in FIG. 5.

The top layer 20 has a width that is slightly greater than the width of the booklet 16. The top layer 20 has the same size as the label 14 because everything above the liner 18 is cut away into the label 14 shape during the printing process using a cutter, such as a die cutter 68. The booklet 16 is sandwiched between the top layer 20 and the label 14. In order to remove the booklet 16 from the label 14, the top layer 20 may include perforations 26, although they are not required. The perforations 26 may be provided between the edge of the booklet 16 and the edge of the top layer 20 at both sides thereof. The perforations 26 may be defined immediately adjacent the edge of each side of the booklet 16 such that when the booklet 16 is torn from the label 14, plastic flaps do not remain on the cover of the booklet 16. Alternatively, where no perforations are provided, a small tab of plastic material will remain on either side of the booklet 16 and may be torn or cut off, if desired.

Spacing is provided around each booklet with label 10 such that a small space is provided between each label 14 and on the sides of each label 14 where the booklet 16 is not present. The release liner 18 is present in these spaces.

In the newspaper industry, different paper and ink types are utilized by different newspaper publishers. Adhesives work differently on different types of paper. Paper types may be broken into groups based upon recycled content. The groups identified herein are (1) papers with less than 40% recycled content and (2) papers with greater than 40% recycled content. Based upon the type of paper, adhesives will exhibit different characteristics. Other groups of paper type may also be identified based upon recycled content, as well as other factors. Other factors that affect how an adhesive will work on a particular media include supplier of paper, type of paper, type of grain of the paper, and chemicals present in the paper, among other factors.

Different types and thicknesses of stock may be utilized in producing the various layers of the assembly 10. For example, the cover layer 20 may be about 0.5-1 mil thick. One type of material that may be used is a clear film polypropylene. The label 14 may be a 60 lb per ream paper stock with two sides of gloss. Alternatively, the label 14 thickness could range from about 40-80 lbs per ream with one or no sides of gloss. The release liner 18 material may be a 52.5 lb per ream material. Other liner materials may also be used such as those ranging from about 40-60 lbs per ream. Types of liner materials that may be utilized include paper, poly coated paper, and polyester, among other types of materials. The booklet 16 may be formed from a paper or other stock having a weight ranging from about 40-60 lbs per ream. More particularly, the booklet stock may have a weight of about 60 lbs per ream, if desired. The adhesive 12, 22 may be applied to the various layers with a chemically engraved gravure cylinder, or other types of cylinders. Moreover, while a booklet 16 is disclosed herein, it is anticipated that other materials could be applied using the process taught herein, such as samples, objects, or other materials. Use of the term "booklet" herein is meant to encompass any type of booklet, object, or other material.

An ultra removable adhesive 12 is utilized that allows the label 14 to adhere to the newsprint properly during installation, but that is fully removable by a user such that the newsprint does not tear during removal. Depending upon the type of ink and ink quality that is applied to the newsprint, some print may transfer with the label 14, but the newsprint will be fully readable after the label 14 is removed. Removal of the label 14 may result in slight lightening of the newsprint.

One type of adhesive 12 that has been found to work well with the first group of papers—those with 40% or less recycled content—has a peel strength of about 25-60 grams/1" width, a loop tack ranging from about 140-300 grams/2" width and a liner release of about 10-60 grams/2" width. One type of adhesive 12 that has been found to work well with the second group of papers—those with 40% or greater recycled content—has a peel strength of about 10-25 grams/1" width, a loop tack of about 40-150 grams/2" width, and a liner release of about 15-150 grams/2" width.

Figure 13:
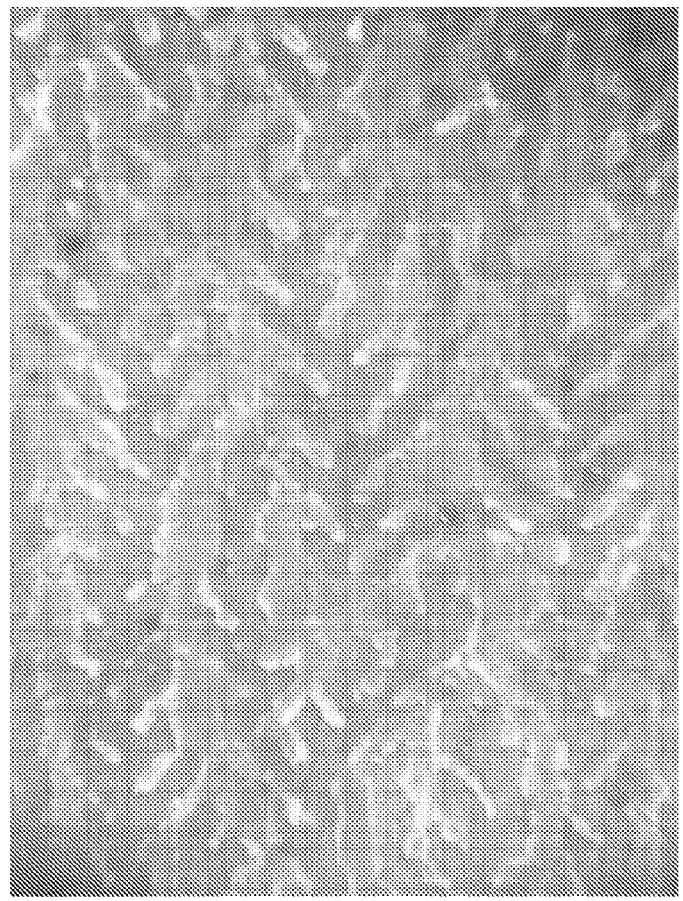
FIG. 13 a microscopic view of the ultra removable adhesive that is applied to the label as part of the example booklet and label.

A preferred adhesive 12 is a microsphere-based adhesive. Microspheres are tiny, microscopic beads in the adhesive that range in size from about 10 microns to about 200 microns. The microspheres provide off-contact points which help to make the adhesive coating 12 more discontinuous than previously known techniques, which involved smoothing out the adhesive. A microscopic view of the roughness of the adhesive 12 when applied with a chemically engraved gravure cylinder, without smoothing, is shown in FIG. 13.

The liner 18 selection in connection with the adhesive 12 selection is also important to the success of dispensing of the booklet/labels 10 onto newsprint, and converting, slitting, die cutting, and stripping of the web material 10. The liner 18 must be properly coupled with the adhesive 12. Where a higher tack adhesive may work with one liner 18, it may not work with another, for example. The relationship of the label 14 to the liner 18 is known as release—how tight the label 14 adheres to the liner 18. One type of liner 18, also referred to as release paper, that may be utilized is silicon coated. The silicon coating 24 allows the adhesive 12 to be peeled off the liner 18.

While prior techniques that utilized a plastic layer against the newsprint often gummed up the presses, the ultra removable adhesive labels 10 of the present invention do not foul up the machinery if they miss the target. In addition, the ultra removable adhesive 12 leaves little, if any, adhesive behind.

Figure 10:
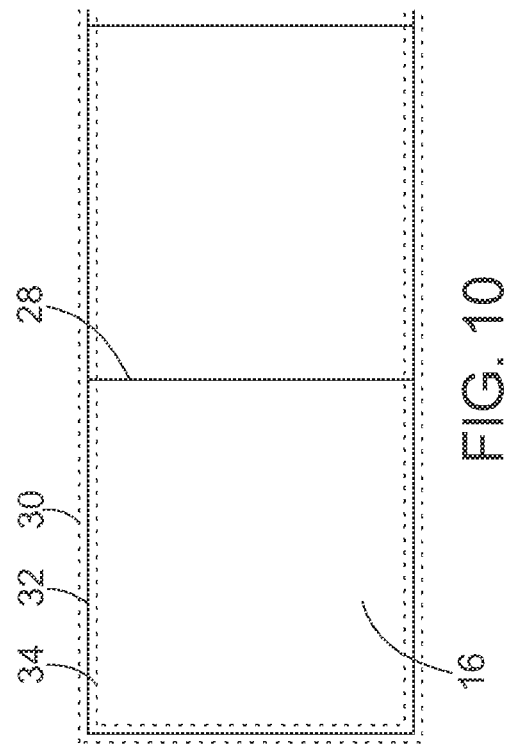
FIG. 10 is a plan view of the four page booklet of FIG. 9 in an unfolded position.

Respective example booklets 16 are shown in FIGS. 5-10. The booklet 16 in FIGS. 5 and 6 has 8 pages, four on the front and four on the back, and three fold lines 28. The folding pattern is referred to as a double parallel fold, among other names. The page that is positioned at the top is considered the cover page. The plastic cover material 20 and tabs are shown applied to the booklet 16 in FIG. 5. The tabs may be removed, if desired. The booklet 16 in FIGS. 7-8 has six pages, three on the front side and three on the back side, and two fold lines 28. The folding pattern of this booklet 16 is referred to as a roll fold. The booklet 16 in FIGS. 9-10 has four pages, two on the front side and two on the back side, and one fold line 28. The folding pattern of this booklet 16 may be referred to as a half fold, among other names. In FIGS. 6, 8, and 10, multiple lines are shown around the edges of the booklet 16. The outer line 30 represents a bleed area for the printed matter, the center line 32 represents the die line (where the booklet 16 will be cut), and the inner line 34 indicates the printed image area of the booklet 16. Other edges may alternatively be utilized. A single unfolded sheet of paper could also be used, such that the booklet 16 has two pages. More than 8 pages may be utilized. For example, 10, 12, 14, 16, or more pages could be used and could be folded in any folding pattern known to those of skill in the art.

Figure 4:
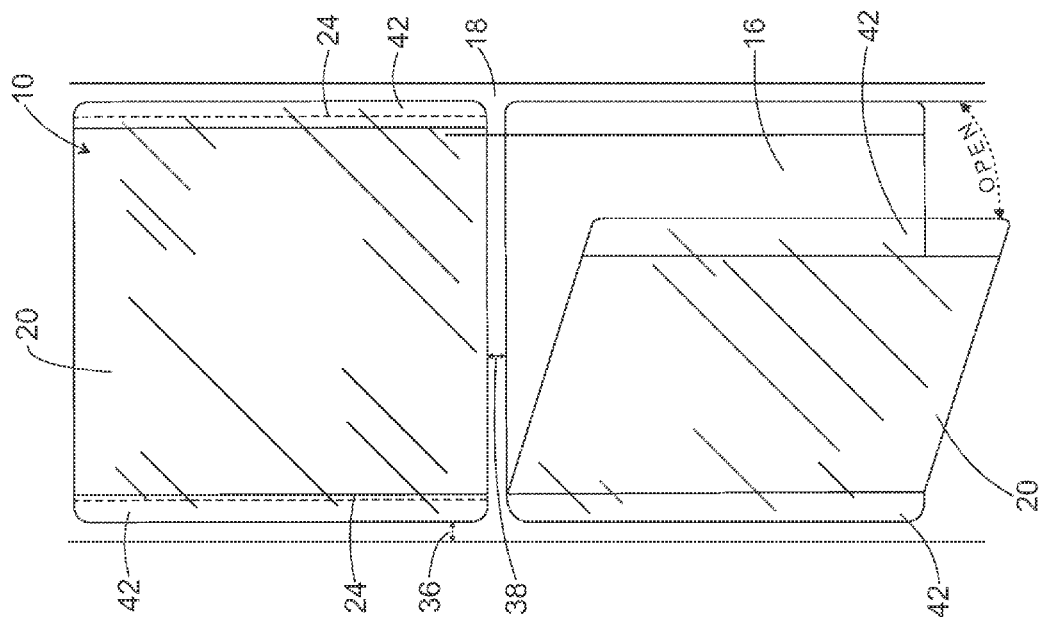
FIG. 4 is a perspective view of two labels/booklets applied to a liner with one of the booklets in an open position to reveal underlying pages of the booklet.
Figure 9:
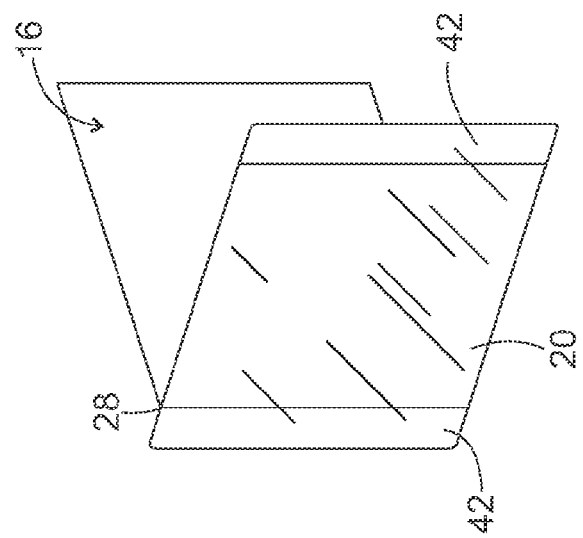
FIG. 9 is a perspective view of a four page booklet.

The liner 18 shown in the figures has a width of about 3⅛"±tolerances. This coincides with the width that may be utilized with label 14 applying machinery that most, if not all, newspaper printers utilize. Other sizes could be manufactured to be hand applied, or if a newspaper printer has a different size label applicator. The label 14 shown in the figures has a width of about 3"±tolerances. The cover 20 shown in the figures has the same width as the label 14. The booklet 16 shown in the figures has a folded width of about 2.6" ±tolerances and a height of about 2.375"±tolerances. An about 0.0625" spacing 36 may be provided between the edge of the label 14 and the edge of the liner 18. A similar spacing may be provided between each label 14. Alternatively, a slightly larger spacing 38 may be provided between the labels 14, such as about 0.125" spacing. Any size spacing, label 14, booklet 16 and cover 20 may be utilized. As shown in FIG. 4, perforations 26 may be provided along the sides of the booklet 16 through the cover material 20. These perforations 26 may be spaced about 0.1"±tolerances or another distance from the edge of the label 14.

Other sizes of booklets 16 may also utilize the teachings of the example booklet with label 10, the invention not being limited to a particular size label 14 or a particular size booklet 16. While the finished, unfolded booklet 16 is described as being long and thin, it alternatively could be a larger sheet of paper that is folded into a smaller size, such as credit card size. Other shapes and sizes may be utilized.

Numerous types of printing may be used on the booklet 16 or other parts of the web, if desired. Various types of printing that may be used, including water based printing, UV flexo printing, offset printing, and other types of printing.

Figure 12:
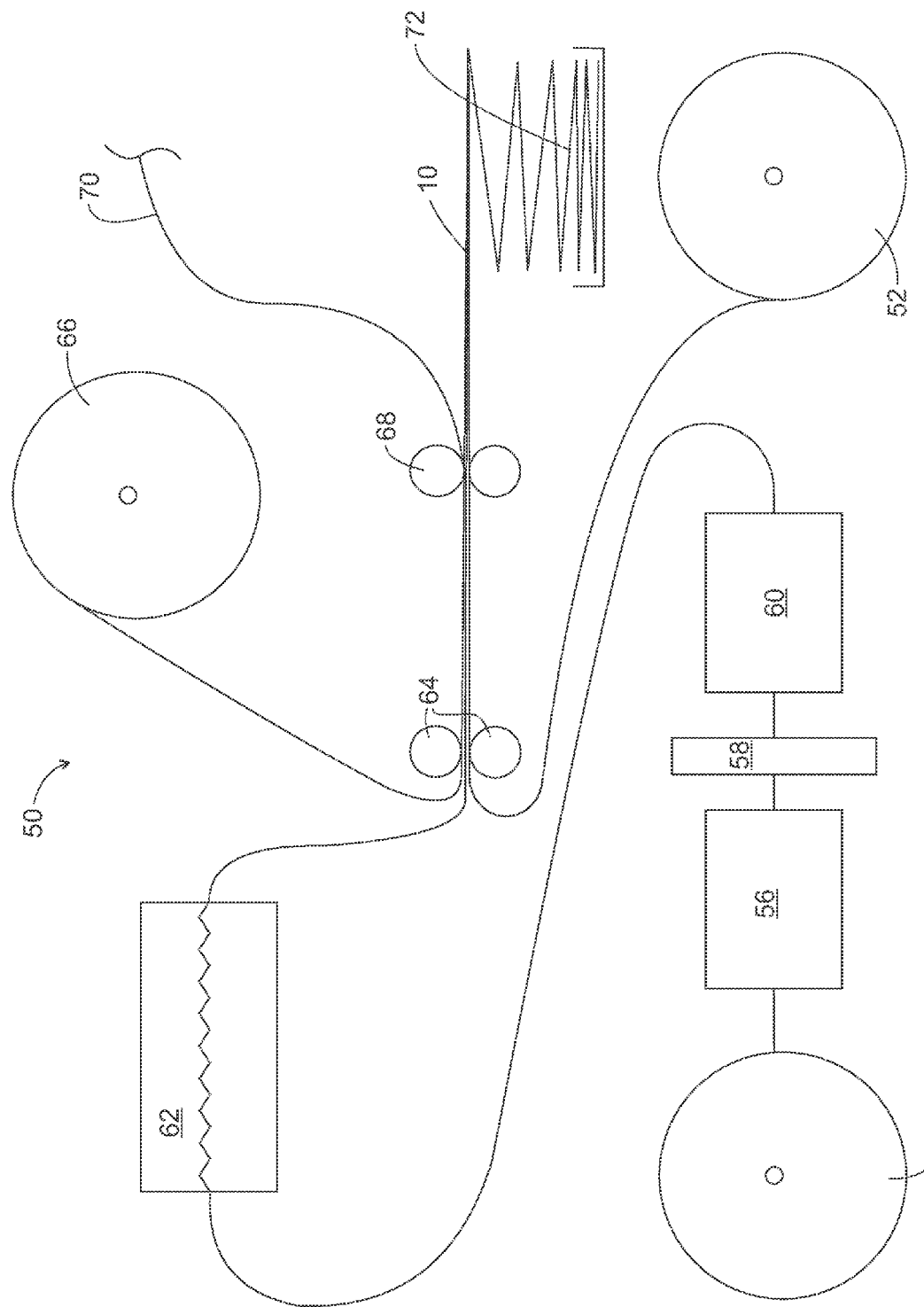
FIG. 12 is a schematic of an example process that may be utilized to form the example label/booklet combination.

Process of Production:

FIG. 12 depicts a schematic of the printing and assembly process 50 for a web 10 like that shown in FIG. 2. While the various materials are shown in one location relative to one another, other locations could be used. For example, a label/liner stock 52 is shown on the right side with a booklet stock 54 on the left side. The location is not critical, as long as the web 10 can be assembled. All the materials could be positioned at one end of the press, for example, if desired.

A booklet stock 54 is provided for the booklets 16 and is positioned on a roll at one end of the machine. Depending upon the type of folding machine 62 utilized and the number of pages desired for the booklet 16, a width and type of paper is selected. In the example booklet 16, a paper having a width equal to the desired width of the booklet 16, such as shown in FIGS. 6, 8, and 10, is typically utilized. The booklet stock 54 goes through a first printing assembly 56 to print a first side of the paper. Then the paper is turned using a turn bar 58 or other assembly and the other side is printed in a second printing assembly 60. The booklet stock 54 then enters a folding unit 62 where the paper is folded from a first width to a second, smaller width. Any variety of intermediate rollers (not shown) may be utilized between the various steps to assist in guiding the web 10. The booklet stock 54 then enters the nip rollers 64 to be assembled into a web 10 with the other materials. One type of folding technique that is useful is a fan folding technique. A fan folding technique allows the booklet stock 54 to run at high speeds consistently. Other folding techniques may alternatively be utilized, as described above.

A preformed label/liner material 52 may be utilized where a roll of material is produced in advance and added to the web assembly. In the example shown, the label/liner stock 52 is positioned on a right end of the press and enters the nip rollers 64 below the folded booklet paper 54. This stock 52 is made in advance and then installed on the press.

Alternatively, the label/liner stock 52 can be produced in the process 20 of creating the web 10 on a single or multiple machines. In particular, a roll of liner and a roll of label stock (not shown) could be provided. Silicon 24 is applied to the upper side of the liner 18 and an ultra removable adhesive 12 is applied to the lower side of the label stock using a chemically etched gravure roller or other application device and then the two are joined together with nip rollers. Once the two have been joined together, they may enter the nip rollers 64 where the final web 10 is produced.

A cover material having an adhesive applied thereto 66 is also installed on top of the web 10 at the nip rollers 64 where the final web 10 is produced. The cover material/adhesive roll 66 is a plastic cover, as discussed above and may be produced in advance in a roll having a pre-applied adhesive attached to the underside of the cover material. A roll 66 of this type may be produced with or without a liner (not shown). Where a liner is installed, the liner is removed before the cover material roll 66 enters the nip rollers 64 where the final web 10 is produced. Where a preformed roll of cover material 66 is utilized, the roll 66 is positioned on the press and the cover material 66 is then applied to the top of the booklet 16 and over the label/liner stock 52 at the nip rollers 64 where the final web 10 is produced, as shown in FIG. 12. The cover material 66 enters the nip rollers 64 above the folded booklet paper 54 with the adhesive 22 facing downward. Alternatively, the adhesive 22 could be applied to the cover material 20 as part of the process 20 of creating the web 10, such that cover material stock is provided on a roll and adhesive is applied via a cylinder or other applicator.

Figure 11:
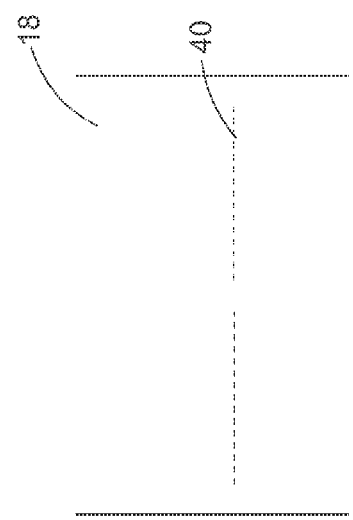
FIG. 11 is a plan view of a perforation pattern that may be utilized with the example label and booklet.

The nip roller 64 joins all three types of stock 52, 54, 66 into a single web of material 10. Then a die cutter 68 cuts out the individual label portions 14 to provide the spacing 36, 38 discussed above and as shown in FIG. 2. The die cutter 68 does not cut through the liner material 18, so the liner 18 remains intact. The waste material 70 is disposed of and the completed web 10 is then stacked upon itself 72 for shipping purposes. One type of stack 72 may be an accordion fold stack where five booklet/labels 10 are provided in each section. In order to assist in folding the web into an accordion stack 72, perforations 40 may be positioned through the liner 18 after every fifth label 14. An example perforation pattern 40 is shown in FIG. 11. Other perforation patterns may alternatively be utilized. The perforations 40 may be formed through the liner 18 either before, after, or during die cutting step of the process 50. As an alternative to perforations, creases or other folding techniques (not shown) can be utilized to force the web to lie down properly in a stack. In addition, an indenting machine (not shown) may be used to assist in folding the web 10 sections into a stack 72. Alternatively, the web 10 may be rolled onto a roll. The completed web of booklets with labels 10 is then shipped to the respective newspapers for application either with a label applicator or by hand.

A firing mark (not shown) may be utilized on the rear surface of the release liner 18 to signal when the booklets 16 are to be positioned on the label 14. The cover material 20 may be perforated along the sides before it is fed into the nip rollers 64 and then applied inline with the booklet and liner/label stock 54, 52.

As discussed above, the label/liner stock 52 may be produced in advance or as part of the web creation process 20. In manufacturing the label/liner stock 52, ultra removable adhesive 12 is applied to the lower surface of the label stock 14. In order to apply the adhesive 12 to the label stock 14, a kiss coating technique is utilized along with a chemically engraved gravure cylinder. This provides a more consistent adhesive coating. A photograph of the adhesive applied to a label surface is shown in FIG. 13. A narrower coat rate, e.g., thickness of the coating, is desired, along with better consistency of the coating. In addition, the adhesive is not smoothed out and is allowed to remain rough, which assists in adhering the final label 14 to newsprint. Alternatively, a direct roll coating could be utilized. Both the kiss coating technique and the direct roll coating technique may utilize a Gravure cylinder that is engraved. One preferred engraving technique is chemical engraving. Other techniques are also know for engraving cylinders and may be utilized.

During application of the cover plastic material 66, tension is applied to the polypropylene layer to deter curling. Proper tension in the various layers of the web 10 results in a flat-lying web. In addition, the speed of application is timed in order to provide layers that lie flat and do not curl. A variety of speeds must often be used based upon the particular newspaper that the labels 14 are being applied to. The adhesive 12 and liner 18 must be matched to allow the web 10 to lie flat and to dispense properly and not pre-dispense, or to inaccurately dispense.

The following factors should be considered in determining the types of materials to utilize with the process 20: cylinder type, adhesive 12 type, liner 18 type, coating type 24 on the liner 18, coating value and weight, and adhesive pattern, among other factors. When the adhesive 12 is applied to the label 14, it is desirable to provide a microscopic pattern, such as that shown in FIG. 13, which is somewhat uneven and discontinuous, and to keep the coating weight up, not smashed down. It is less desirable to smooth out the adhesive coating since less than 100% contact between the label 14 and the coating is preferred. The uneven coating creates random microscopic peaks and valleys. Others have defined specific patterns for adhesive patterns. Different patterns can be provided by using different rollers, including different random patterns.

An ultra removable booklet with label for application to media is provided for a first type of media having a recycled content of 40% or less and a second type of media having recycled content of 40% or greater. The booklet with label includes a release liner, an ultra removable adhesive layer, a paper stock layer, a booklet, an adhesive layer, and a clear plastic cover layer. The ultra removable adhesive layer has a peel strength in a range of about 25 gms/1" width to about 60 gms/1" width for the first type of media, and a peel strength in the range of about 10 gms/1" width to about 25 gms/1" width for the second type of media. The clear plastic cover layer has the adhesive layer applied to a bottom surface thereof and the bottom surface is positioned over the booklet. The booklet is positioned over the paper stock. The ultra removable adhesive layer is attached to the lower surface of the paper stock. The release liner is applied to the ultra removable adhesive layer.

In an another example, an ultra removable booklet with label for application to media includes a release liner, an ultra removable adhesive, a paper stock layer, a booklet, and a covering layer. The covering layer is positioned over the booklet, the booklet is positioned over the paper stock, the ultra removable adhesive layer is attached to the lower surface of the paper stock, and the release liner is positioned below the ultra removable adhesive layer.

The booklet with label may also include a silicon layer coupled to the release liner and positioned between the release liner and the ultra removable adhesive layer. The booklet with label may further include an adhesive layer positioned on a lower surface of the covering layer. The covering layer may be one of a paper stock or a plastic layer. The plastic layer may be a clear plastic layer. The clear plastic layer may have a width that is greater than a width of the booklet.

The ultra removable adhesive layer may have a preferred peel strength range and the preferred peel strength range varies based upon the recycled content of the media. The media may be newsprint having a recycled content that includes a first group having a recycled content of 40% or below and a second group having a recycled content of 40% or above. For the first group of newsprint, peel strength may be in the range of about 25 gms/1" width to about 60 gms/1" width. For the second group of newsprint, peel strength may be in the range. For the first group of newsprint, loop tack range for the ultra removable adhesive may be about 140 gms/2" width to about 300 gms/2" width. For the second group of newsprint, loop tack range for the ultra removable adhesive may be about 40 gms/2" width to about 150 gms/2" width. For the first group of newsprint, the liner may have a release characteristic of about 10 gms/2" width to about 60 gms/2" width. For the second group of newsprint, the liner may have a release characteristic of about 15 gms/2" width to about 60 gms/2" width.

The covering may be a polypropylene that is coated with a permanent adhesive.

The booklets with labels may be spaced from one another on the liner and from the edges of the liner.

An example process for forming a web having a booklet positioned on a label with an ultra removable adhesive includes forming the label stock, forming a booklet, applying the booklet to the label stock, and applying a cover material over the label stock. The forming a label stock step includes providing a liner that is coated with a silicon material; providing a roll of paper stock, applying an ultra removable adhesive to a paper stock utilizing a kiss coating technique and a gravure cylinder; attaching the paper stock, adhesive side down, to the liner to form a label stock, with the silicon material being positioned on an upper face of the liner so that the silicon and ultra removable adhesive contact each other. The forming the booklet step includes printing indicia on at least a first side of a booklet paper stock, cutting the booklet paper stock, and folding the booklet paper stock.

The process may further include removing any excess material from the web of materials to define distinct booklets with labels on a liner. The cover material may be one of a clear plastic material or a printed paper stock. The process may also include perforating the cover material in the vicinity of both ends thereof. The process may further include perforating or creasing the liner and stacking respective sections of the web upon itself into an accordion pattern so that each section lies flat.

The example process may also include controlling the tension of the label stock, booklets, and/or cover material as they move through the process so that sections of the web lie flat when completed. The example process may also include controlling the speed of the label stock, booklets, and cover material as they move through the process in order to avoid curling of the booklets or labels.

The term "substantially," as used herein, is a term of estimation. The term "about" as used herein, means approximately ±10%.

While various features of the claimed examples are presented above, it should be understood that the features may be used singly or in any combination thereof. Therefore, the claimed examples are not to be limited to only the specific examples depicted herein.

Further, it should be understood that variations and modifications may occur to those skilled in the art to which the claimed examples pertain. The examples described herein are exemplary. The disclosure may enable those skilled in the art to make and use alternative designs having alternative elements that likewise correspond to the elements recited in the claims. The intended scope may thus include other examples that do not differ or that insubstantially differ from the literal language of the claims. The scope of the disclosure is accordingly defined as set forth in the appended claims.

What is claimed is:

1. An ultra removable booklet with label for high speed application to media of a first type having a recycled content of 40% or less and a second type having recycled content of 40% or greater, said booklet with label comprising:
   a release liner;
   an ultra removable adhesive layer having a peel strength in a range of about 25 gms/1" width to about 60 gms/1" width for the first type of media, and a peel strength in the range of about 10 gms/1" width to about 25 gms/1" width for the second type of media;
   a paper stock layer;
   a booklet;
   an adhesive layer; and
   a clear plastic cover layer;
   wherein the clear plastic cover layer has the adhesive layer applied to a bottom surface thereof and the bottom surface is positioned over the booklet, the booklet is positioned over the paper stock, the ultra removable adhesive layer is attached to the lower surface of the paper stock, and the release liner is applied to the ultra-removable adhesive layer.

2. The booklet of claim 1, further comprising a silicon layer coupled to the release liner and positioned between the release liner and the ultra removable adhesive layer.

3. The booklet of claim 1, further comprising a silicon layer coupled to the release liner and positioned between the release liner and the ultra removable adhesive layer.

4. The booklet of claim 1, wherein the covering layer is one of a paper stock or a plastic layer.

5. The booklet of claim 1, wherein the plastic layer is a clear plastic layer.

6. The booklet of claim 5, wherein the clear plastic layer has a width that is greater than a width of the booklet.

7. The booklet of claim 1, wherein the ultra removable adhesive layer has a preferred peel strength range and the preferred peel strength range varies based upon the recycled content of the media.

8. The booklet of claim 7, wherein the media is newsprint and the recycled content includes a first group having a recycled content of 40% or below and a second group having a recycled content of 40% or above.

9. The booklet of claim 8, wherein for the first group of newsprint, a peel strength is in the range of about 25 gms/1" width to about 60 gms/1" width, and for the second group of newsprint, a peel strength is in the range of about 10 gms/1" width to about 25 gms/1" width.

10. The booklet of claim 8, wherein for the first group of newsprint, a loop tack range for the ultra removable adhesive is about 140 gms/2" width to about 300 gms/2" width, and for the second group of newsprint, a loop tack range for the ultra removable adhesive is about 40 gms/2" width to about 150 gms/2" width.

11. The booklet of claim 8, wherein for the first group of newsprint, the liner has a release characteristic of about 10 gms/2" width to about 60 gms/2" width, and for the second group of newsprint, the liner has a release characteristic of about 15 gms/2" width to about 60 gms/2" width.

12. The booklet of claim 1, wherein the covering is a polypropylene that is coated with a permanent adhesive.

13. The booklet of claim 1, wherein the booklets are spaced from one another on the liner and from the edges of the liner.

14. The ultra-removable booklet of claim 1, wherein the ultra-removable adhesive is microsphere-based.

15. The booklet of claim 14, wherein each microsphere is a microscopic bead in the adhesive that ranges from 10 microns to about 200 microns.

16. An ultra removable booklet with label for high speed application to media of a first type having a recycled content of 40% or less and a second type having recycled content of 40% or greater, said booklet with label comprising:
   a release liner;
   an ultra removable adhesive having a loop tack range of about 140 gms/2" width to about 300 gms/2" width for the first type of media, and a loop tack range of about 40 gms/2" width to about 150 gms/2" width for the second type of media;
   a paper stock layer;
   a booklet; and
   a covering layer;
   wherein the covering layer is positioned over the booklet, the booklet is positioned over the paper stock, the ultra removable adhesive layer is attached to the lower surface of the paper stock, and the release liner is positioned below the ultra-removable adhesive layer.

* * * * *